(12) United States Patent
Yoon et al.

(10) Patent No.: US 12,430,801 B2
(45) Date of Patent: Sep. 30, 2025

(54) CAMERA CALIBRATION FOR A DIGITIAL SIDE MIRROR SYSTEM

(71) Applicant: SL Mirrortech Corporation, Siheung-si (KR)

(72) Inventors: Hyungsik Yoon, Siheung-si (KR); Younghoon Lee, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 543 days.

(21) Appl. No.: 17/966,673

(22) Filed: Oct. 14, 2022

(65) Prior Publication Data

US 2023/0119041 A1 Apr. 20, 2023

(30) Foreign Application Priority Data

Oct. 20, 2021 (KR) .................. 10-2021-0140256

(51) Int. Cl.
*G06T 7/80* (2017.01)
*B60K 35/00* (2024.01)
*B60K 35/22* (2024.01)
*B60R 1/00* (2022.01)
*B60R 1/12* (2006.01)
(Continued)

(52) U.S. Cl.
CPC ............... *G06T 7/80* (2017.01); *B60K 35/00* (2013.01); *B60K 35/22* (2024.01); *B60R 1/00* (2013.01); *B60R 1/12* (2013.01); *B60R 1/22* (2022.01); *B60R 11/04* (2013.01); *B60K 2360/21* (2024.01); *B60R 2001/1253* (2013.01); *B60R 2300/402* (2013.01); *G06T 2207/20092* (2013.01); *G06T 2207/30208* (2013.01); *G06T 2207/30244* (2013.01); *G06T 2207/30252* (2013.01)

(58) Field of Classification Search
CPC ............ G06T 7/80; G06T 2207/20092; G06T 2207/30208; G06T 2207/30244; G06T 2207/30252; B60R 1/22; B60R 1/00; B60R 1/12; B60R 11/04; B60R 2001/1253; B60R 2300/402; B60K 35/22; B60K 35/00; B60K 2360/21
See application file for complete search history.

(56) References Cited

U.S. PATENT DOCUMENTS 10,192,309 B2 * 1/2019 Sakano ................. H04N 7/183
2019/0222824 A1 * 7/2019 Sheridan ............. H04N 13/117
2024/0042936 A1 * 2/2024 Germaine ................ B60R 1/22

FOREIGN PATENT DOCUMENTS

| CN | 112050751 B | * | 7/2022 | .......... G01B 11/002 |
| DE | 102020212218 A1 | * | 3/2022 | |
| KR | 20210100610 A | * | 8/2021 | |

* cited by examiner

*Primary Examiner* — Jennifer Mehmood
*Assistant Examiner* — Shan A Baig
(74) *Attorney, Agent, or Firm* — United One Law Group LLC; Kongsik Kim; Jhongwoo Peck

(57) ABSTRACT

A digital side mirror system comprises imaging devices disposed on both sides of a vehicle, a display device including a screen for outputting images captured by the imaging device, and a control device. The control device receives a pattern board image, generates calibration information that includes at least one of a distance between a reference line and a center of the pattern board image or an angle of the pattern board image with respect to the reference line, and transmits a calibration image that includes the calibration information to the display device.

13 Claims, 14 Drawing Sheets

(51) Int. Cl.
*B60R 1/22* (2022.01)
*B60R 11/04* (2006.01)

CAMERA CALIBRATION FOR A DIGITIAL SIDE MIRROR SYSTEM

CROSS-REFERENCE TO RELATED APPLICATION

This application claims priority from Korean Patent Application No. 10-2021-0140256, filed on Oct. 20, 2021, which is incorporated herein by reference in its entirety.

BACKGROUND

1 Technical Field

The present disclosure relates to a digital side mirror system, and more particularly, to a digital side mirror system that provides correction information for facilitating rearrangement of a pattern board.

2. Description of the Related Art

A digital side mirror (DSM) system refers to a system that provides an image of a vehicle's surroundings captured by a camera to a driver. The driver may secure a view of the rear side of the vehicle via images captured by cameras disposed on both sides of the vehicle.

In order to build a digital side mirror system, an operation, in which cameras are installed in both side housings of the vehicle, is typically performed. In this case, the direction, in which each camera looks (e.g., points), may be slightly different depending on the installation work environment of the camera. If the direction the camera is looking is not correct, it cannot provide the driver with the correct field of view.

Accordingly, an error correction operation of moving the position of the image regardless of the direction, in which the camera looks, may be performed. The error correction operation may be performed so that a specific region of the image captured by the camera is included in the screen.

A pattern board may be used in performing an error correction operation. A user may perform error correction operation using the pattern board included in the image captured by the camera as a reference.

However, if the pattern board is not properly arranged, the error correction may not be satisfactorily performed.

Accordingly, when the pattern board is not correctly arranged, a means that supports the user is needed so that the pattern board can be correctly rearranged.

SUMMARY

An object of the present disclosure is to provide a digital side mirror system that provides correction information for facilitating rearrangement of a pattern board.

In order to achieve the above object, a digital side mirror system according to an embodiment of the present disclosure may include imaging devices (e.g., cameras) disposed on both sides of a vehicle; a display device including a screen for outputting images captured by the imaging device; and a control device. The control device may include a receiving unit for receiving an image including a pattern board image that represents a pattern board disposed at a rear side of the vehicle from the imaging device; an image processing unit for recognizing the pattern board image by analyzing the image, and in order for a center of the pattern board image to be displayed on the screen of the display device, generating calibration information of the pattern board for making the center of the pattern board image to be disposed on a preset reference line, and/or a center line of the pattern board image to be disposed on the reference line; and a transmitting unit for transmitting a calibration image generated by including the calibration information in the image to the display device. In particular, the calibration information may include at least one of a distance between the reference line and the center of the pattern board image or an angle of the pattern board image with respect to the reference line.

The calibration information may further include a color display object that is displayed in different colors based on at least one of the distance between the reference line and the center of the pattern board image or the angle of the pattern board image with respect to the reference line.

The image processing unit may generate the calibration information of the pattern board for making a size of a pattern region included in the pattern board image and a size of a preset reference pattern region to be equal, and the calibration information may include a difference between the size of the pattern region and the size of the reference pattern region.

The calibration information may include an icon that indicates a movement direction and/or a rotation direction of the pattern board to allow the center of the pattern board image to be disposed on the reference line on the screen of the display device and/or the size of the pattern region to be equal to the size of the reference pattern region; and one or more characters that indicate a movement distance and/or a rotation angle of the pattern board. The calibration information may include image information indicating that calibration of the pattern board is completed in response to the center of the pattern board image being disposed on the reference line, the center line of the pattern board image being disposed on the reference line, or the size of the pattern region and the size of the reference pattern region being equal.

The image processing unit may compare the center of the pattern board image with the reference line in real time, the center line of the pattern board image with the reference line, or the size of the pattern region with the size of the reference pattern region to generate the calibration information in real time. The calibration information may include a color display object that is displayed in different colors based on the difference between the size of the pattern region and the size of the reference pattern region.

The reference line may include a first reference line oriented in a horizontal direction on the screen of the display device; and a second reference line oriented in a vertical direction on the screen of the display device. In particular, a distance between the first reference line and the center of the pattern board image may correspond to a required movement distance in an up-down direction for rearrangement of the pattern board, and a distance between the second reference line and the center of the pattern board image may correspond to a required movement distance in a left-right direction for rearrangement of the pattern board.

The pattern board image may include a plurality of pattern regions arranged in an up-down direction; and a plurality of intersection points formed where corners of adjacent pattern regions among the plurality of pattern regions meet, and an angle between the center line of the pattern board image formed by connecting the plurality of intersection points and the second reference line may correspond to a required rotation angle for calibrating a posture of the pattern board.

Operation modes of the control device may include a first mode, in which the display device outputs images to assist a driver while driving, and a second mode, in which the display device outputs images to assist in correcting an installation error of the imaging device. The control device may further include an input unit for receiving a vehicle selection command in the second mode, and the display device may include a touch screen for providing a function of the input unit.

The image processing unit may separately generate calibration information representing movement of the pattern board and calibration information representing rotation of the pattern board. Subsequently, the transmitting unit may sequentially transmit the calibration information representing movement of the pattern board and the calibration information representing rotation of the pattern board.

The digital side mirror system according to the embodiment of the present disclosure as described herein can allow the user to more easily rearrange the pattern board by providing correction information for facilitating the rearrangement of the pattern board.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
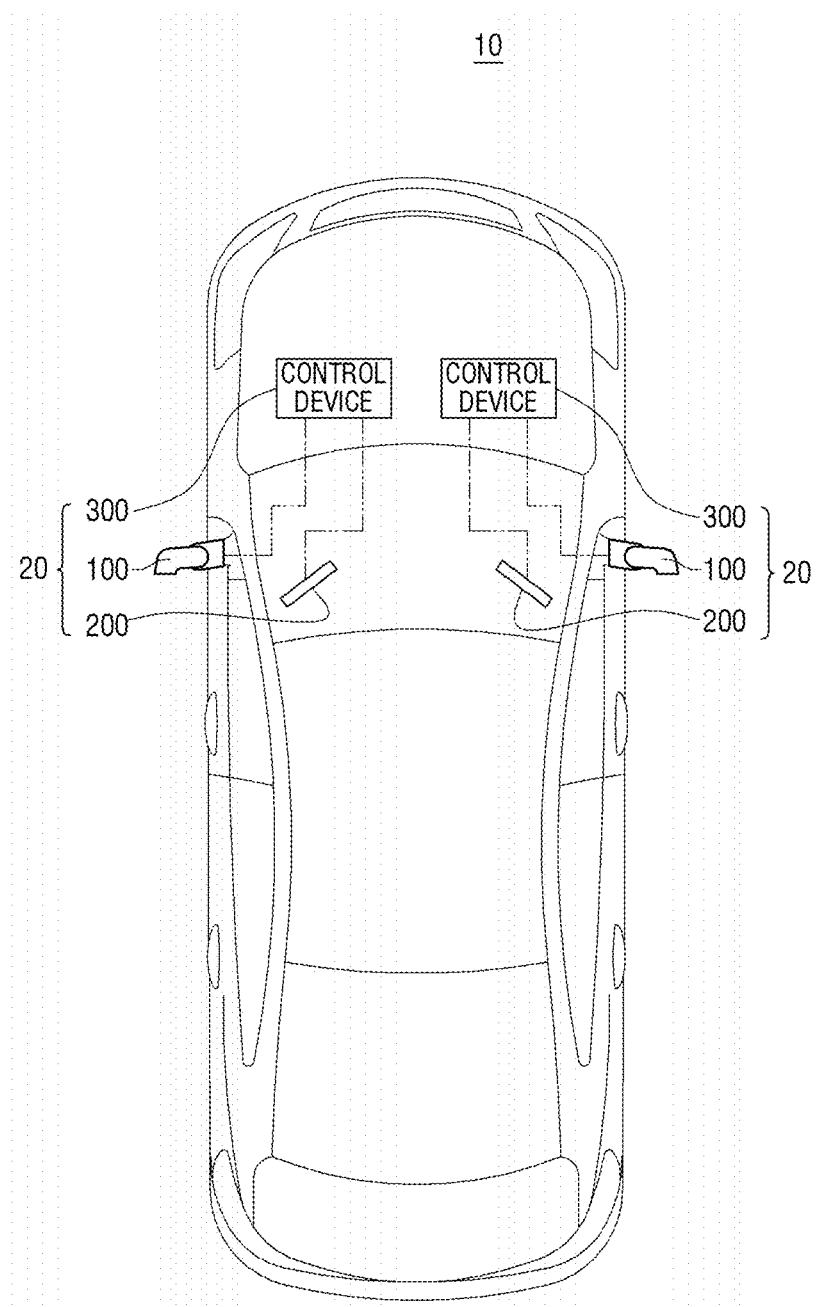
FIG. 1 shows a vehicle equipped with a digital side mirror system according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a digital side mirror system according to embodiments of the present disclosure.

Figure 2:
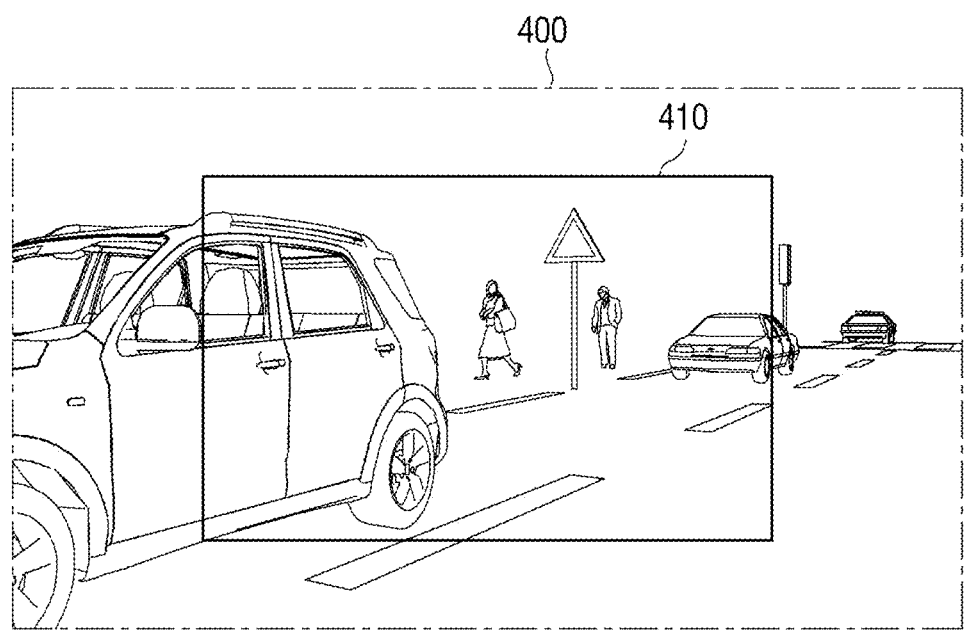
FIG. 2 describes the relationship between the image of the imaging device and the extracted region.
Figure 3:
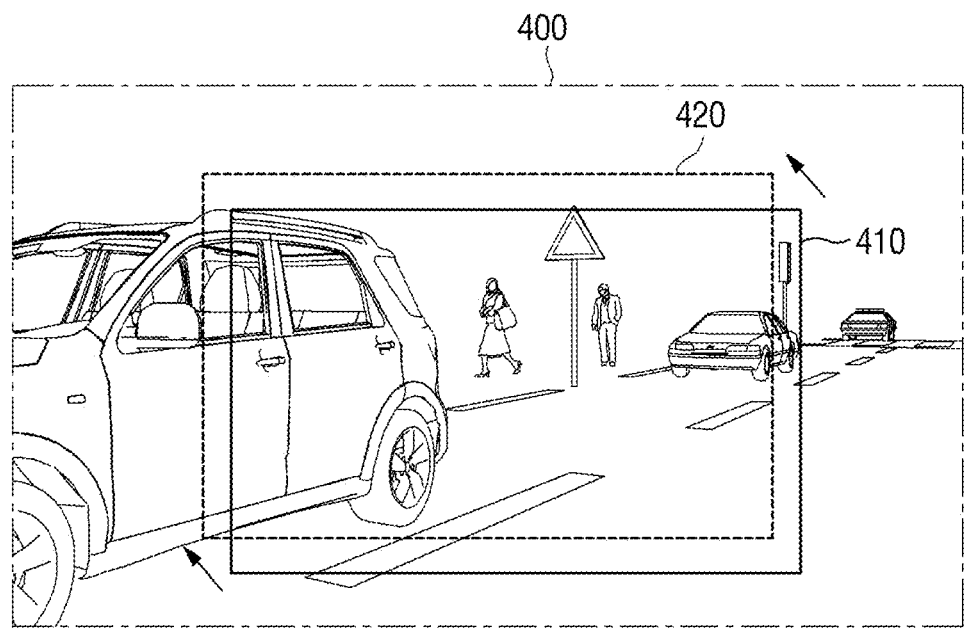
FIG. 3 describes the arrangement of the image of the imaging device being adjusted.

FIG. 1 shows a vehicle including a digital side mirror system according to an embodiment of the present disclosure, FIG. 2 describes the relationship between the image of the imaging device and the extracted region, and FIG. 3 describes the arrangement of the image of the imaging device being adjusted.

Referring to FIG. 1, a vehicle 10 may include a digital side mirror system 20. The digital side mirror system 20 according to the embodiment of the present disclosure may include an imaging device (e.g., camera) 100, a display device 200, and a control device 300.

The imaging device 100 may generate an image of the subject. For example, the imaging device 100 may include an image sensor such as a charge coupled device (CCD) or a complementary metal oxide semiconductor (CMOS). Light input to the imaging device 100 may be detected by the image sensor, and the detected light may be converted into an electrical signal to generate a digital image. The image generated by the imaging device 100 may be an image of the surroundings of the vehicle 10.

The display device 200 may output an image captured by the imaging device 100. Accordingly, the surrounding image obtained by the imaging device 100 may be displayed via the display device 200 provided inside the vehicle. Using the displayed image, the driver can grasp the situation of the rear or the rear side of the vehicle. However, it is exemplary that the image captured by the imaging device 100 is the rear or the rear side of the vehicle 10, and the present disclosure is not limited thereto. The imaging device 100 may obtain a surrounding image in at least one direction, in which the driver's view is required.

The display device 200 may be provided for each imaging device 100. In other words, as shown in FIG. 1, the imaging devices 100 may be provided on both sides of the vehicle 10, and the display device 200 corresponding to each imaging device 100 may be provided inside the vehicle 10. Each display device 200 may display an image captured by the corresponding imaging device 100. On the other hand, according to some embodiments of the present disclosure, one display device 200 may display an image captured by both imaging devices 100, or three or more display devices 200 may display an image captured by a selected imaging device 100 among the imaging devices 100 on both sides.

The control device 300 may be configured to relay (e.g., transmit) an image between the imaging device 100 and the display device 200. The image captured by the imaging device 100 may be transmitted to the display device 200 through the control device 300. In turn, the display device 200 may output the image received from the control device 300.

Referring to FIG. 2, the control device 300 may be configured to extract an image of a certain region 410 from among the image 400 of the imaging device 100 and transmit it to the display device 200. Hereinafter, a region extracted from the image 400 of the imaging device 100 and transmitted to the display device 200 is referred to as an extracted region 410.

The extracted region 410 may represent a region corresponding to the screen of the display device 200, and the size of the extracted region 410 and the size of the screen of the display device 200 may match.

The center of the extracted region 410 may or may not match the center of the image 400. When the image 400 is received from the imaging device 100, the control device 300 may be configured to transmit the extracted region 410 that corresponds to preset coordinates among the image 400 to the display device 200.

Referring back to FIG. 1, in the present disclosure, the control device 300 may be configured to output a corrected image, on which the image captured by the imaging device 100 is corrected, via the display device 200. In the present disclosure, the correction may indicate that the position of the extracted region 410 is adjusted so that a particular region of the image 400 captured by the imaging device 100 is included in the screen of the display device 200.

When the digital side mirror system 20 is mounted in the vehicle 10, an operation of installing the imaging device 100 may be performed. During the installation, the direction that the installed imaging device 100 faces, may have variations from a vehicle to another vehicle. That is, variations may occur between directions that the imaging device 100 faces for each vehicle. In this case, images included in the extracted region 410 may be different for the imaging devices 100 installed in different vehicles.

For a same vehicle model, an image of a predetermined region (hereinafter, referred to as a target region) 420 (see FIG. 3) among the images 400 captured by the imaging device 100 may need to be produced to be output via the screen of the display device 200. Here, the target region 420 may represent a region of the same range that is preset with respect to the position of the vehicle 10 or the position of the imaging device 100. Meanwhile, the position of the target region 420 among the images 400 captured by different imaging devices 100 may be different for different imaging devices 100. This is because there may be an installation error (e.g., assembly tolerance) associated with the installation of each imaging device 100.

Referring to FIG. 3, the extracted region 410 and the target region 420 in the image 400 may be different before the error correction. Whereas the control device 300 is configured to transmit the extracted region 410 of the image 400 to the display device 200, if the extracted region 410 and the target region 420 are different from each other, the target region 420 may not be output on the display device 200. Accordingly, it is preferable to transmit the extracted region 410 of the image 400 to the display device 200 in a state where the extracted region 410 and the target region 420 are matched.

The control device 300 may be configured to transmit an image of the target region 420 within the images 400 received from the imaging device 100 to the display device 200. To this end, the control device 300 may be configured to correct (e.g., compensate for) an installation error of the imaging device 100 to allow the target region 420 and the extracted region 410 to be matched, and then transmit the image of the extracted region 410 to the display device 200. Accordingly, the display device 200 of all vehicles outputs an image of a target region 420.

Correction of the installation error may be performed by adjusting the position of the extracted region 410. As shown in FIG. 3, the installation error may be corrected by moving the extracted region 410 to allow the extracted region 410 and the target region 420 in the image 400 to be matched.

An operation for correcting an installation error of the imaging device 100 (hereinafter referred to as an error correction operation) may be performed separately. The control device 300 may be configured to store position correction values for the extracted region 410 obtained through the error correction operation, and thereafter, may be configured to apply the position correction values to the image 400 received from the imaging device 100 to match the extracted region 410 and the target region 420, and then extract the image. In addition, the control device 300 may be configured to transmit the extracted image of the extracted region 410 to the display device 200.

Since the control device 300 is configured to correct the installation error of the installed imaging device 100 and transmit the image, the display device 200 of all vehicles can output the image of the target region 420 irrespective of the installation error.

In the present disclosure, the control device 300 may be configured to operate in a first mode (e.g., normal mode) or a second mode (e.g., correction mode). The normal mode indicates a mode for assisting the driver's driving. In the normal mode, the control device 300 may be configured to cause the display device 200 to output an image to assist the driver while driving. For example, the control device 300 may be configured to correct the image 400 captured by the imaging device 100 based on the position correction values and transmit it to the display device 200 in the normal mode.

The correction mode indicates a mode, in which the control device 300 causes the display device 200 to output an image to assist correction of the installation error of the imaging device 100. For example, the control device 300 may be configured to transmit the image 400 captured by the imaging device 100 to the display device 200 as is (e.g., uncorrected) in the correction mode. Also, the control device 300 may be configured to output a correction region 50 and a calibration information 500 on the screen 210 of the display device 200 in the correction mode. A user may perform an error correction operation with reference to the image being output through the display device 200.

Hereinafter, an error correction operation will be described with reference to FIGS. 4 to 6.

Figure 4:
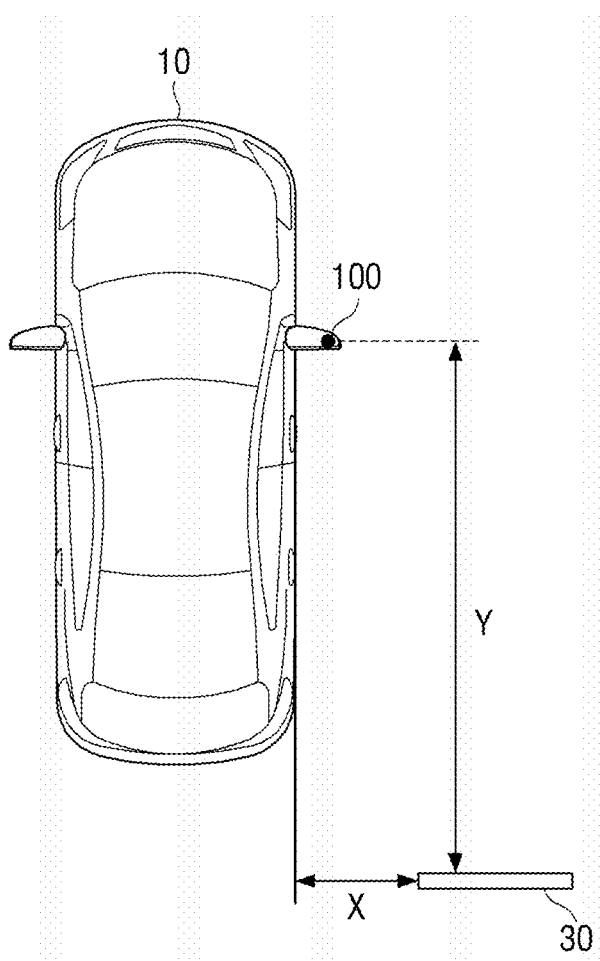
FIG. 4 shows that the pattern board is installed at the rear side of the vehicle.
Figure 5:
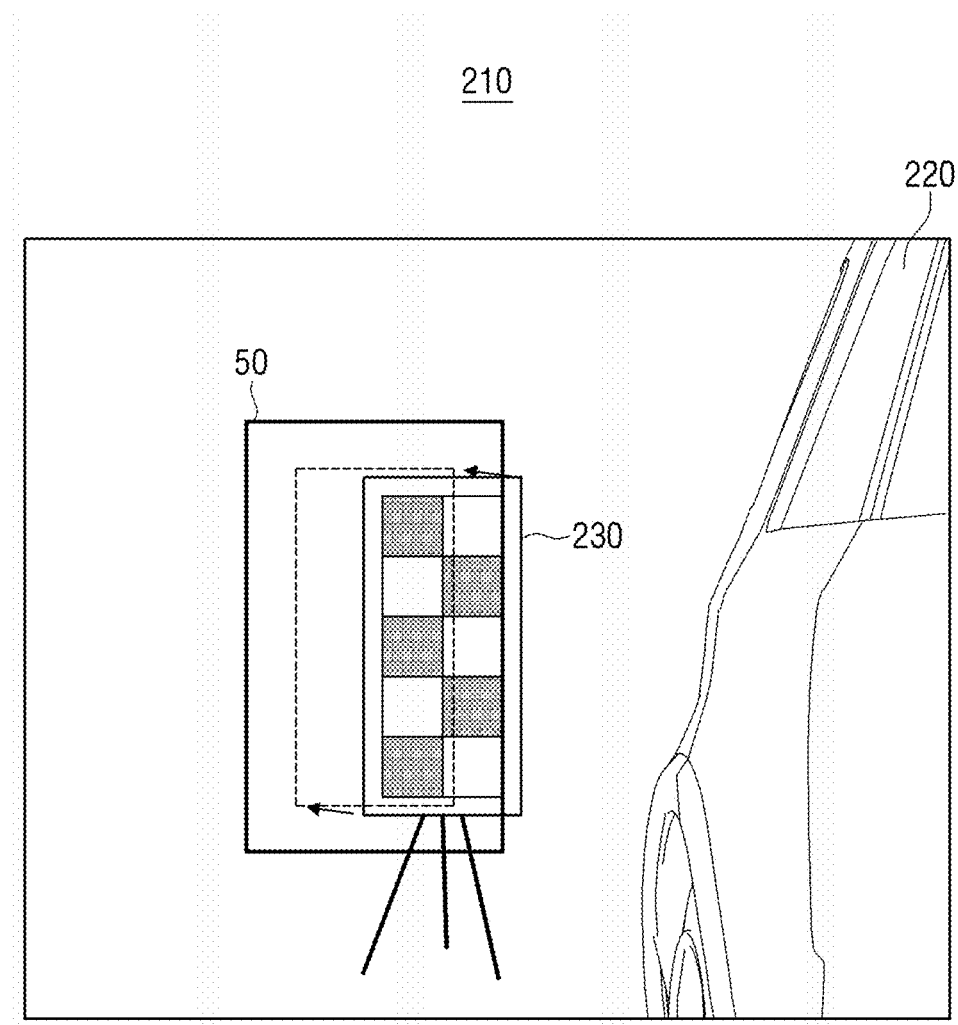
FIG. 5 shows that an image is output on the screen of the display device.
Figure 6:
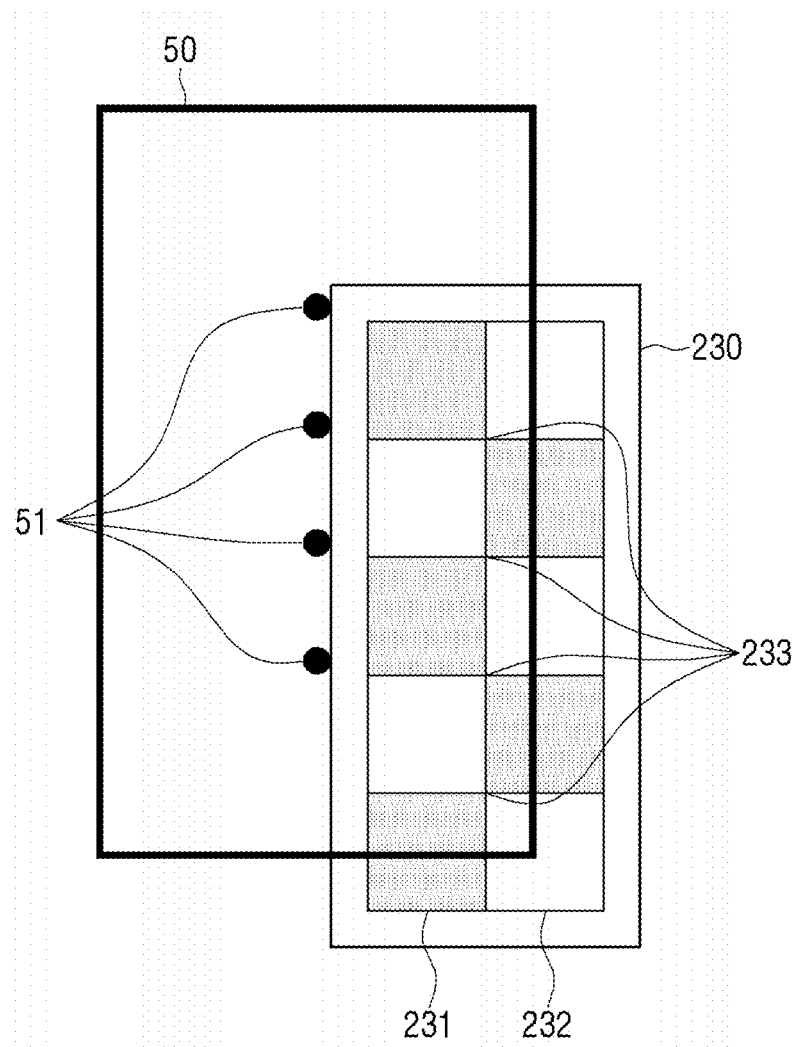
FIG. 6 describes the relationship between the correction region and the pattern board image.

FIG. 4 shows that a pattern board is installed at the rear side of the vehicle, FIG. 5 shows that an image is output on the screen of the display device, FIG. 6 describes the relationship between the correction region and the pattern board image.

Referring to FIG. 4, the pattern board 30 may be installed at the rear side of the vehicle 10 for correction of the installation error of the imaging device 100. In the present disclosure, the pattern board 30 represents a board, on which a pattern including a dark region 231 and a bright region 232 (see FIG. 6) is displayed. Here, the dark region 231 and the bright region 232 (hereinafter, collectively referred to as a pattern region) may have a square or rectangular shape, and all of the pattern regions 231 and 232 may have the same size.

The installation position of the pattern board 30 may be set differently for each vehicle model. In other words, dimensions X and Y shown in FIG. 4 may be different for each vehicle model.

Referring to FIG. 5, the screen 210 of the display device 200 may output an image received from the control device 300. The image output through the screen 210 of the display device 200 may include a vehicle image 220 corresponding to a portion of the vehicle 10 and a pattern board image 230 corresponding to the pattern board 30. The image before the error correction operation may not match the target image.

For the error correction operation, the image may include a correction region 50. The correction region 50 may be generated by the control device 300 during the error correction operation. The correction region 50 may be displayed at a specific region of the screen 210 of the display device 200 and may provide a reference position for the pattern board image 230.

An arrangement error between the correction region 50 and the pattern board image 230 may be used to determine a difference between the extracted region 410 and the target region 420. As illustrated, when the center of the pattern board image 230 deviates from the center of the correction region 50, it may be determined that the extracted region 410 and the target region 420 are shifted. In this case, the error correction operation may be performed by moving the extracted region 410 to allow the pattern board image 230 to be aligned with the correction region 50. Since the correction region 50 is fixed to a specific region of the screen 210, even if the extracted region 410 moves, the correction region 50 may not move on the screen 210.

A reference point included in the correction region 50 may be used to align the pattern board image 230 with the correction region 50. As such, referring to FIG. 6, the correction region 50 may include one or more reference points 51.

The pattern board image 230 may include a plurality of pattern regions 231 and 232. The pattern board image 230 may include intersection points 233, at which the corners of the plurality of pattern regions 231 and 232 meet. For example, the middle of four adjacent pattern regions 231 and 232 may be an intersection point 233. All of the pattern regions 231 and 232 may have the same size. Accordingly, distances between adjacent intersection points 233 may be uniform.

The correction region 50 may include a plurality of reference points 51. The number of reference points 51 may equal to the number of intersection points 233 included in the pattern board image 230. In addition, an interval between adjacent reference points 51 may equal to an interval between adjacent intersection points 233.

The operation of aligning the pattern board image 230 with the correction region 50 may be performed by matching the plurality of reference points 51 included in the correction region 50 with the plurality of intersection points 233 included in the pattern board image 23. When the extracted region 410 is moved so that the plurality of reference points 51 and the plurality of intersection points 233 match with one another, it may be determined that the pattern board image 230 is aligned with the correction region 50.

When the pattern board image 230 is aligned with the correction region 50, the error correction operation may be terminated. Moving the extracted region 410 to align the pattern board image 230 with the correction region 50 may be automatically performed by the control device 300. The control device 300 may be configured to store the position correction values, which are the movement distances of the extracted region 410, and apply the position correction values to the image 400 received from the imaging device 100 to move the extracted region 410 during the normal mode operation, and then transmit the image of the extracted region 410 to the display device 200.

Figure 7:
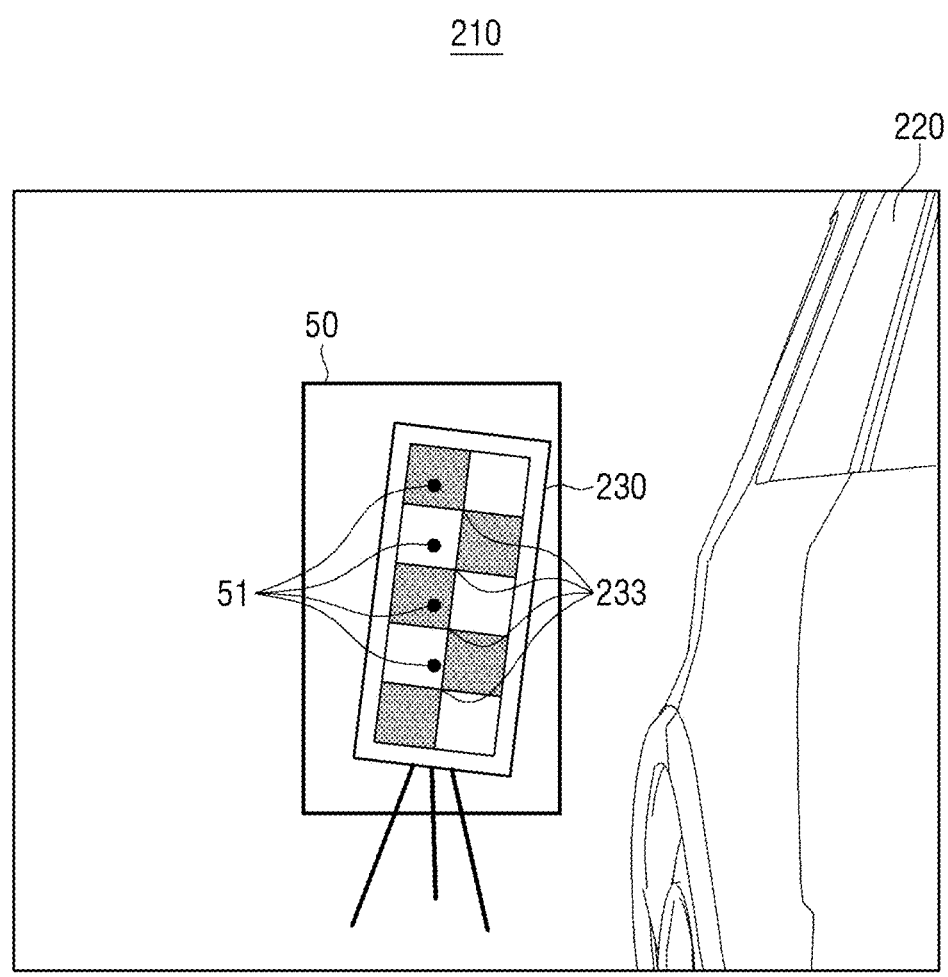
FIG. 7 illustrates an example, in which a pattern board is abnormally arranged.

FIG. 7 illustrates an example, in which the pattern board is abnormally arranged (e.g., misplaced). Referring to FIG. 7, when the pattern board 30 for the error correction operation is abnormally arranged, the pattern board image 230 may also be abnormally displayed on the screen 210 of the display device 200.

The pattern board 30 may be installed by a user. The pattern board 30 may be abnormally arranged due to the user's carelessness or due to the working environment. Although FIG. 7 illustrates that the pattern board image 230 is displayed as inclined with respect to the correction region 50, the pattern board image 230 may be displayed at an abnormal position with respect to the correction region 50.

When the pattern board image 230 is abnormally displayed, the error correction operation may not be performed reliably. For example, when the pattern board image 230 is displayed as being inclined with respect to the correction region 50 as shown, the reference points 51 of the correction region 50 and the intersection points 233 of the pattern board image 230 cannot be matched by only translating the extracted region 410.

When the pattern board 30 is abnormally arranged, it may be required to be rearranged by the user. As such, the control device 300 may be configured to provide the user with information requesting that the pattern board 30 be correctly rearranged.

Figure 8:
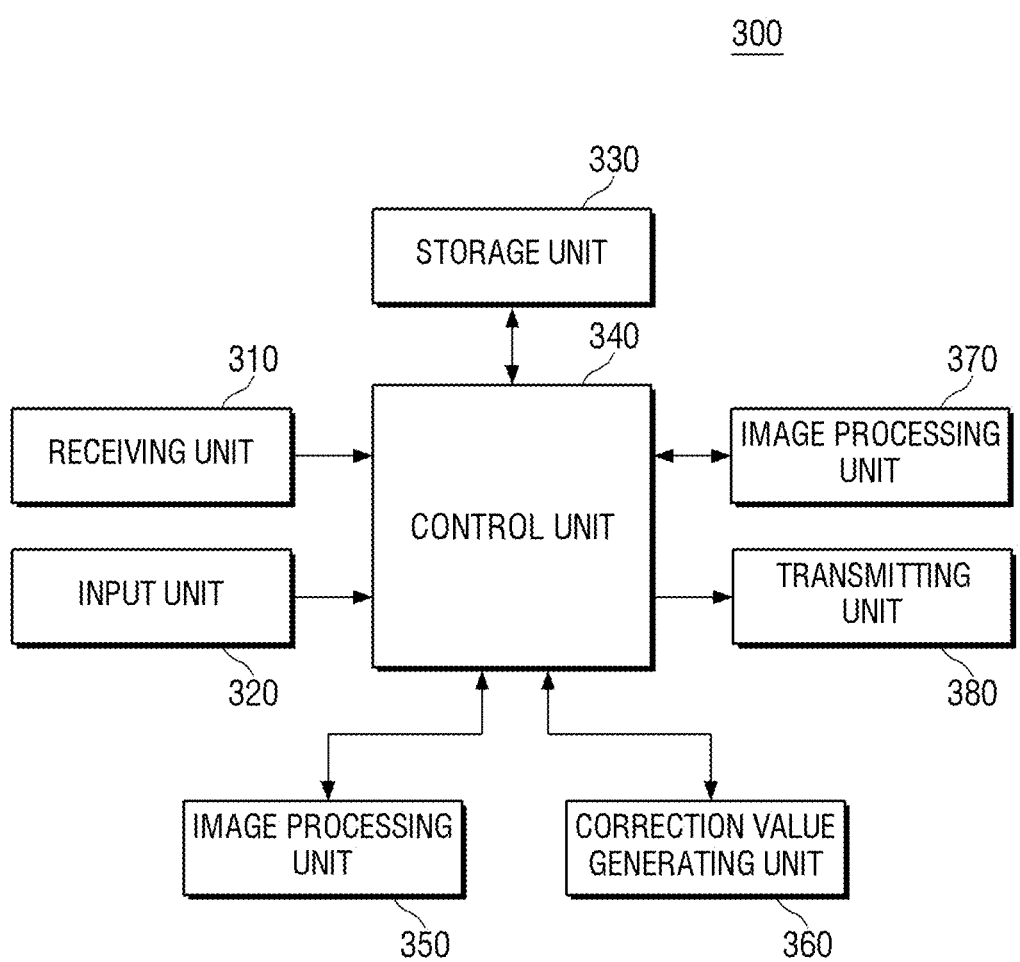
FIG. 8 shows a block diagram of a control device.
Figure 9:
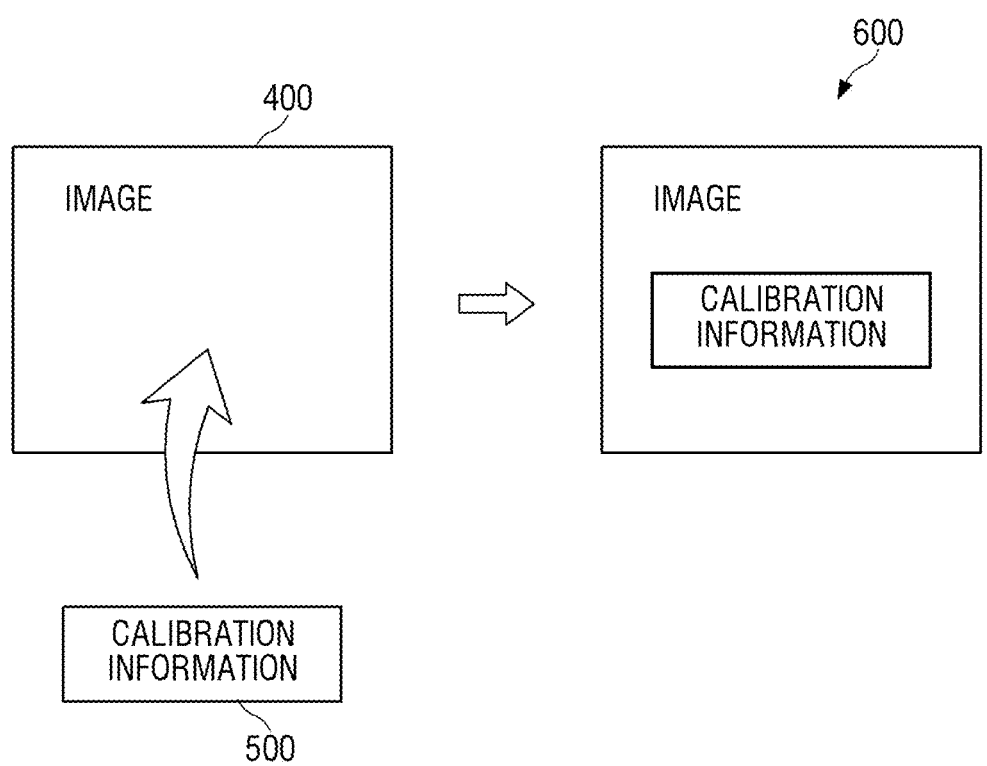
FIG. 9 schematically describes generation of a calibration image.

FIG. 8 shows a block diagram of a control device, and FIG. 9 schematically describes generation of a calibration image. Referring to FIG. 8, the control device 300 may include a receiving unit 310, an input unit 320, a storage unit 330, a control unit 340, a region generating unit 350, a correction value calculating unit 360, an image processing unit 370, and a transmitting unit 380.

The receiving unit 310 may receive the image 400 including the pattern board image 230 representing the pattern board 30 from the imaging device 100. The pattern board 30 may be disposed at the rear side of the vehicle 10. The receiving unit 310 may receive an image substantially in real time by maintaining a communication channel with the imaging device 100. In the present disclosure, the image 400 of the imaging device 100 may be used to calculate the position correction values or may be used to provide the surrounding environment of the vehicle 10 to the driver.

The input unit 320 may receive a vehicle selection command in the correction mode. More specifically, the input unit 320 may receive the vehicle model information of the vehicle 10, on which the error correction operation is being performed. The vehicle model information may be used to determine the size and position of the correction region 50 to be displayed on the screen 210 of the display device 200. In case the screen 210 of the display device 200 includes a touch screen function, the screen 210 of the display device 200 may also function as the input unit 320. Alternatively, a separate input means provided in the vehicle 10 may provide the function of the input unit 320, or a separate device connected to the vehicle 10 for the error correction operation may provide the function of the input unit 320.

The storage unit 330 may store the position correction values. The position correction values may be generated during the error correction operation in the correction mode of the control device 300. Once the position correction values are generated, in response to the image 400 being received through the receiving unit 310 in the normal mode of the control device 300, the image of the extracted region 410, to which the position correction values are applied, may be transmitted to the display device 200. Further, the storage unit 330 may at least temporarily store the image received through the receiving unit 310.

The region generating unit 350 may generate the correction region 50. The region generating unit 350 may generate the correction region 50 corresponding to the vehicle model that is input via the input unit 320. The user may perform an error correction operation by aligning the pattern board image 230 to the correction region 50 on the screen 210 of the display device 200.

The correction value calculating unit 360 may calculate position correction values for correcting the position of the extracted region 410 to allow the pattern board image 230 to be aligned with the correction region 50 on the screen 210 of the display device 200. The translation of the extracted region 410 may be automatically performed by the correction value calculating unit 360. The correction value calculating unit 360 may move the extracted region 410 to allow the pattern board image 230 to be aligned with the correction region 50 with reference to the image analysis result received from the image processing unit 370. In other words, the correction value calculating unit 360 may move the extracted region 410 so that the reference points 51 included in the correction region 50 and the intersection points 233 included in the pattern board image 230 match with one another, and may calculate the position correction values that correspond to the distances by which the extracted region 410 is required to be moved to match with the target region 420. In some embodiments, the position correction values may include a horizontal distance and a vertical distance, respectively.

The image processing unit 370 may analyze the image 400. The image processing unit 370 may analyze the image 400 to recognize edges of the pattern board image 230 or recognize intersection points 233 included in the pattern board image 230. The analysis result of the image 400 may be transmitted to the correction value calculating unit 360.

In addition, in the normal mode of the control device 300, the image processing unit 370 may apply the position correction values to the image 400 captured by the imaging device 100 to extract an image to be output on the screen 210 of the display device 200. In other words, the image processing unit 370 may cause the extracted region 410 to match with the target region 420 by applying the position correction values and may thereby extract an image corresponding to the extracted region 410.

The image processing unit 370 may analyze the image to recognize the pattern board image 230, and generate the calibration information 500 of the pattern board 30 (see FIG. 9), which allows the center 234 (see FIGS. 10 and 11) of the pattern board image 230 to be displayed on the screen 210 of the display device 200 such that the center 234 may be matched with the preset reference lines 61 and 62 (see FIGS. 10 and 11), or the center line 235 (see FIG. 12) of the pattern board image 230 may be matched with the reference line 62, or the size of the pattern regions 231 and 232 included in the board image 230 and the size of a preset reference pattern region may be matched. In addition, the image processing unit 370 may generate a calibration image 600 by inserting the calibration information 500 into the image received by the receiving unit 310.

A detailed description of aligning the pattern board 30 to the reference line or rearranging the pattern board 30 so that the size of the pattern region and the size of the reference pattern region are the same will be described in detail with reference to FIGS. 10 to 14.

In the present disclosure, the calibration information 500 may include icons and characters. The icons may indicate the movement direction or the rotation direction of the pattern board 30 so that the center of the pattern board image 230 matches the reference line on the screen 210 of the display device 200 or the size of the pattern region matches the size of the reference pattern region. For example, an arrow icon corresponding to a movement direction or an arrow icon corresponding to a rotation direction may be included in the calibration information 500.

The characters may indicate a movement distance or a rotation angle of the pattern board 30. For example, a number corresponding to a moving distance or a number corresponding to a rotation angle may be included in the calibration information 500.

In addition, the calibration information 500 may include at least one of a distance between the reference line and the center of the pattern board image 230, an angle of the pattern board image 230 with respect to the reference line, or a size difference between the pattern region and the reference pattern region. Specifically, the calibration information 500 may include a color display object that represents a color based on at least one of the distance between the reference line and the center of the pattern board image 230, the angle of the pattern board image 230 with respect to the reference line, or the size difference between the pattern region and the reference pattern region. The color display object may be output on the screen 210 of the display device 200. For example, the color display object may be implemented in the shape of a box formed along the edge of the pattern board image 230. The user may easily identify the rearrangement status of the pattern board 30 on the screen 210 by using the color display object. By way of example, the box may be displayed in red when the pattern board image 230 is not aligned with the correction region 50, and may be displayed in green when the pattern board image 230 is sufficiently aligned with the correction region 50.

In addition, the calibration information 500 may include image information indicating that the calibration of the pattern board 30 is completed (hereinafter, referred to as completion information) when the center 234 of the pattern board image 230 matches the reference line, the center line 235 of the pattern board image 230 matches the reference line, or the size of the pattern regions 231 and 232 matches the size of the reference pattern region. The user may determine that the pattern board 30 is correctly rearranged by referring to the completion information being output on the screen 210 of the display device 200.

The image processing unit 370 may generate the calibration information 500 in real time by comparing the center 234 of the pattern board image 230 and the reference line, comparing the center line 235 of the pattern board image 230 and the reference line, or comparing the size of the reference regions 231, 232 and the size of the reference pattern region. For example, when the distance between the center 234 of the pattern board image 230 and the reference line is changed, the image processing unit 370 may generate the calibration information 500 including the distance change in real time. The user may identify the calibration information 500 that is changed in real time via the screen 210 of the display device 200.

The transmitting unit 380 may transmit the calibration image 600 (see FIG. 9) generated by including the calibration information 500 in the image 400 to the display device 200. The control unit 340 may be configured to perform overall control of the receiving unit 310, the input unit 320, the storage unit 330, the region generating unit 350, the correction value calculating unit 360, the image processing unit 370, and the transmitting unit 380. Referring to FIG. 9, the calibration image 600 may be generated by adding the calibration information 500 to the image 400. The image processing unit 370 may generate the calibration image 600 by adding the calibration information 500 to the image 400. The image processing unit 370 may generate the calibration image 600 by adding the calibration information 500 generated in real time to the image 400 that changes in real time.

Figure 10:
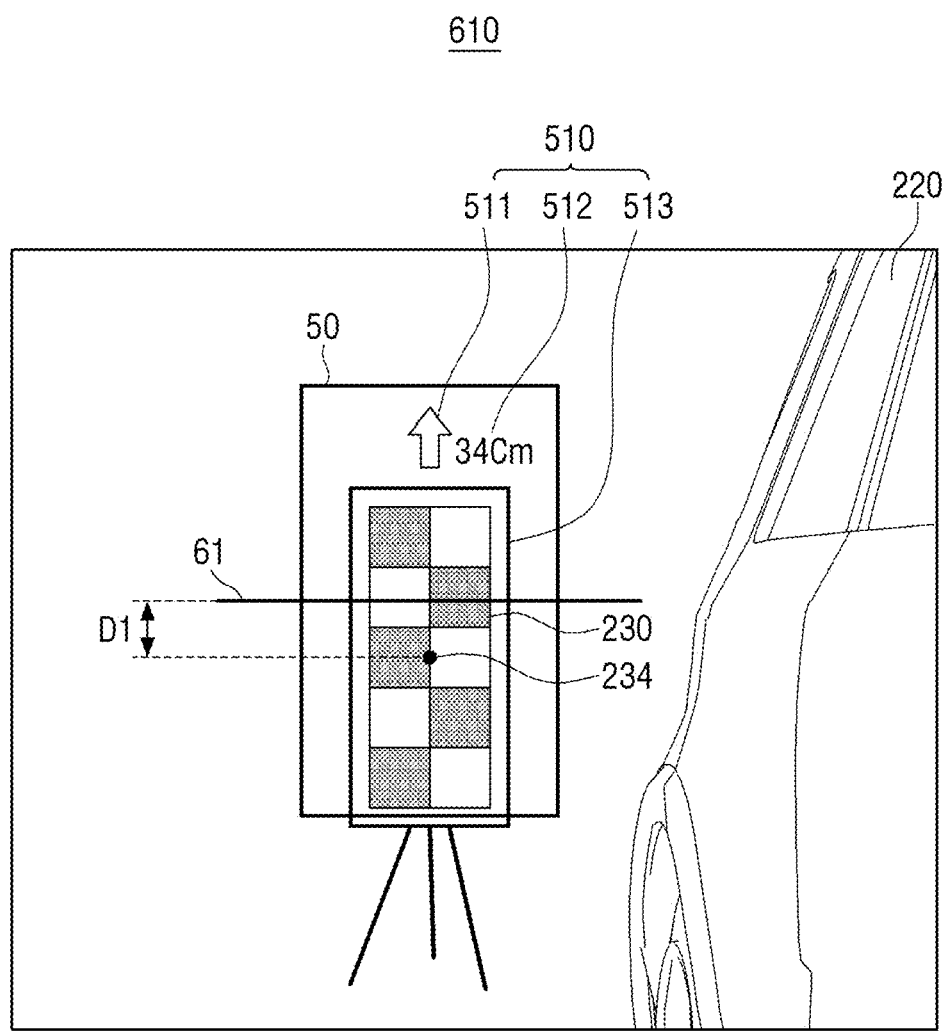
FIG. 10 shows a calibration image including calibration information of instructing the first movement of the pattern board.
Figure 11:
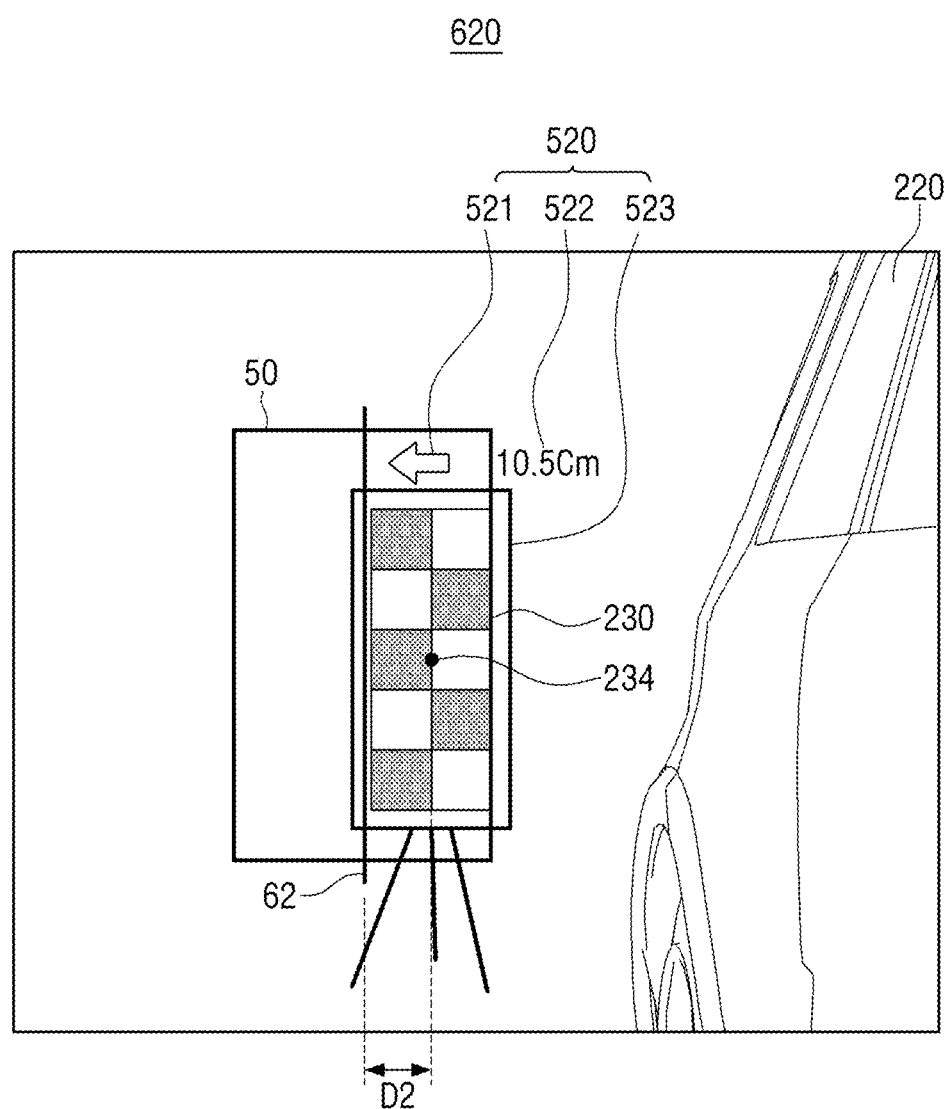
FIG. 11 shows a calibration image including calibration information of instructing the second movement of the pattern board.
Figure 12:
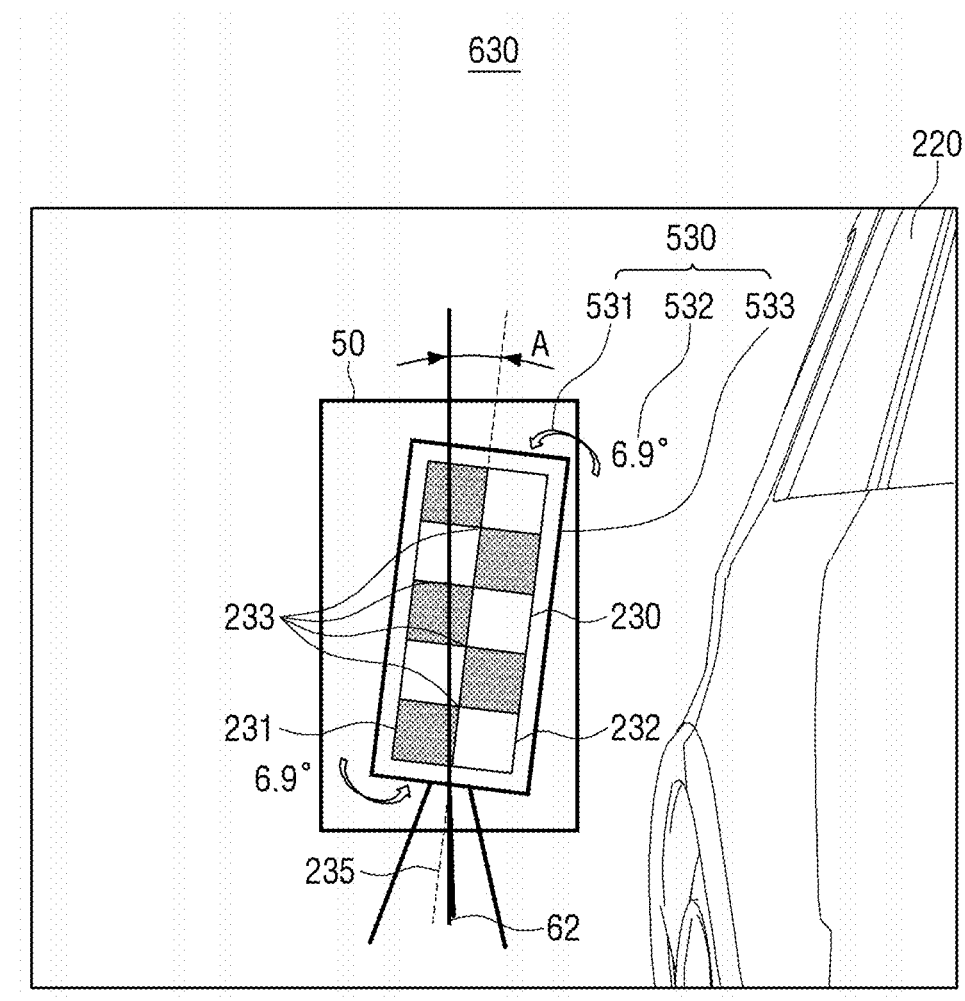
FIG. 12 shows a calibration image including calibration information of instructing the rotation of the pattern board.
Figure 13:
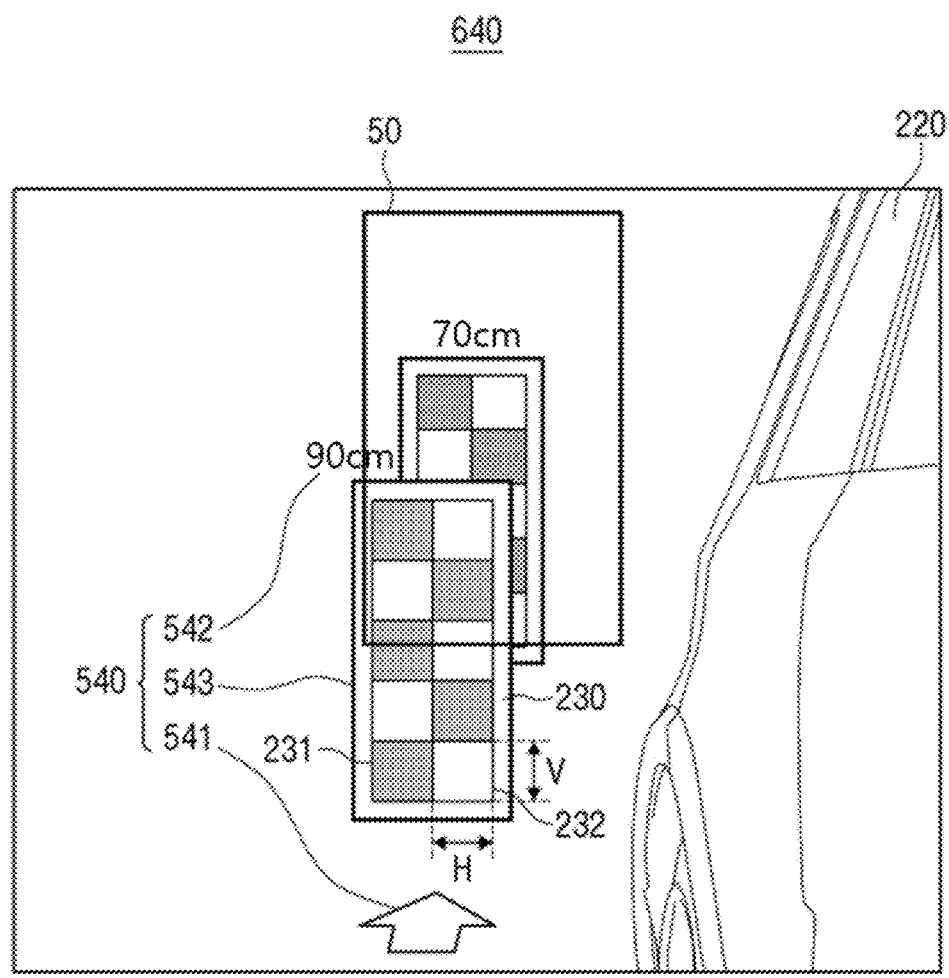
FIG. 13 shows a calibration image including calibration information of instructing the third movement of the pattern board.
Figure 14:
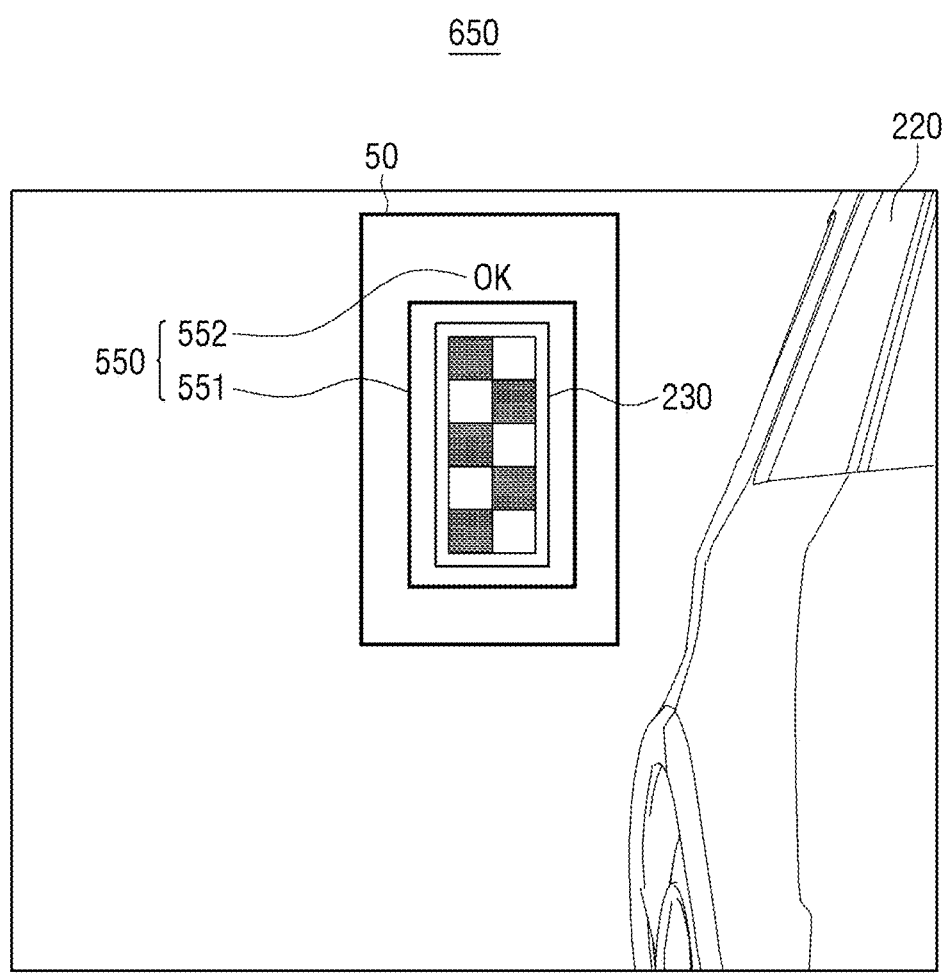
FIG. 14 shows a calibration image including image information indicating that calibration of the pattern board is completed.

FIG. 10 shows a calibration image including calibration information of instructing the first movement of the pattern board, FIG. 11 shows a calibration image including calibration information of instructing the second movement of the pattern board, FIG. 12 shows a calibration image including calibration information of instructing the rotation of the pattern board, FIG. 13 shows a calibration image including calibration information of instructing the third movement of the pattern board, FIG. 14 shows a calibration image including image information of indicating that calibration of the pattern board is completed.

Referring to FIG. 10, the calibration image 610 may include calibration information 510 of instructing the first movement of the pattern board 30.

In the present disclosure, the first movement may refer to moving the pattern board 30 in the up-down direction while the base of the pattern board 30 is fixed on the ground (i.e., adjusting the vertical height of the pattern board 30). FIG. 10 illustrates an example of calibration information 510 for instructing movement of the pattern board 30 in the upward direction. The calibration information 510 may be generated by comparing the pattern board image 230 with a reference line. In the present disclosure, the reference line may include a first reference line 61. The first reference line 61 may be oriented along a horizontal direction on the screen 210 of the display device 200. The (shortest) distance D1 between the first reference line 61 and the center 234 of the pattern board image 230 may correspond to a required movement distance in the up-down direction for rearrangement of the pattern board 30. When the pattern board 30 is moved upward or downward by the required movement distance corresponding to the distance D1, the center 234 of the pattern board image 230 may be disposed on the first reference line 61. The required movement distance may be confirmed using the movement distance included in the calibration information 510.

The calibration information 510 may include an icon 511 indicating a movement direction and a character 512 indicating a movement distance. In some embodiments, the calibration information 510 may also include a color display object 513. The color display object 513 may be displayed in different colors depending on a distance between the first reference line 61 and the center 234 of the pattern board image 230. The user may rearrange the pattern board 30 by referring to the calibration information 510 that is output on the screen 210 of the display device 200.

Referring to FIG. 11, the calibration image 620 may include calibration information 520 of instructing the second movement of the pattern board 30.

In the present disclosure, the second movement may refer to moving the pattern board 30 in the left-right direction on the ground without changing the distance between the imaging device 100 and the pattern board 30. For example, the second movement may mean adjusting the dimension X in FIG. 4. FIG. 11 illustrates an example of calibration information 520 for instructing movement of the pattern board 30 in the left direction. The calibration information 520 may be generated by comparing the pattern board image 230 with a reference line. In the present disclosure, the reference line may include a second reference line 62. The second reference line 62 may be oriented along a vertical direction on the screen 210 of the display device 200. The (shortest) distance D2 between the second reference line 62 and the center 234 of the pattern board image 230 may correspond to a required movement distance in the left-right direction for rearrangement of the pattern board 30. When the pattern board 30 is moved in the left or right direction by the required movement distance corresponding to the distance D2, the center 234 of the pattern board image 230 may be disposed on the second reference line 62. The required movement distance may be confirmed using the movement distance included in the calibration information 520.

The calibration information 520 may include an icon 521 indicating a movement direction and a character 522 indicating a movement distance. In some embodiments, the calibration information 520 may also include a color display object 523. The color display object 523 may be displayed in different colors depending on a distance between the second reference line 62 and the center 234 of the pattern board image 230. The user may rearrange the pattern board 30 by referring to the calibration information 520 that is output on the screen 210 of the display device 200.

Referring to FIG. 12, the calibration image 630 may include calibration information 530 of instructing rotation of the pattern board 30.

In the present disclosure, the rotation of the pattern board 30 may refer to rotating the pattern board 30 with respect to a rotation axis perpendicular to the major surface of the pattern board 30. FIG. 12 illustrates an example of calibration information 530 for instructing rotation of the pattern board 30 in a counterclockwise direction. The calibration information 530 may be generated by comparing the pattern board image 230 with the second reference line 62. The pattern board image 230 may include a plurality of pattern regions 231 and 232 arranged in an up-down direction, and may include a plurality of intersection points 233 where corners of the plurality of pattern regions 231 and 232 meet. The angle A between the center line 235 of the pattern board image 230 formed by connecting the plurality of intersection points 233 and the second reference line 62 may correspond to a required rotation angle for correcting the posture of the pattern board 30. When the pattern board 30 is rotated clockwise or counterclockwise by the required rotation angle of A, the center line 235 of the pattern board image 230 may be disposed on the second reference line 62. The required rotation angle may be confirmed using the rotation angle included in the calibration information 530.

The calibration information 530 may include an icon 531 indicating a rotation direction and a character 532 indicating a rotation angle. In some embodiments, the calibration information 530 may also include a color display object 533. The color display object 533 may be displayed in different colors depending on an angle between the second reference line 62 and the center line 235. The user may rearrange the pattern board 30 by referring to the calibration information 530 that is output on the screen 210 of the display device 200.

Referring to FIG. 13, the calibration image 640 may include calibration information 540 of instructing the third movement of the pattern board 30.

In the present disclosure, the third movement may refer to a movement of the pattern board 30 on the ground, in which the distance between the imaging device 100 and the pattern board 30 is adjusted. For example, the third movement may mean adjusting the dimension Y in FIG. 4. FIG. 13 illustrates an example of calibration information 540 for indicating movement away from the imaging device 100. The calibration information 540 may be generated by using the sizes of the pattern regions 231 and 232 included in the pattern board image 230. For example, when the horizontal length and vertical length of the pattern regions 231 and 232 displayed on the screen 210 of the display device 200 are H and V, respectively, they may be compared with the horizontal length HO and vertical length and VO of the preset reference pattern region. Thus, when the size of the pattern regions 231 and 232 is smaller than the size of the reference pattern region, the calibration information 540 for moving the pattern board 30 closer to the imaging device 100 may be generated, and when the size of the pattern regions 231 and 232 is larger than the size of the reference pattern region, calibration information 540 for moving the pattern board 30 away from the imaging device 100 may be generated. According to the present disclosure, the sizes of the reference pattern region may be predetermined for each vehicle model and be stored on the control device 300.

The calibration information 540 may include an icon 541 indicating a movement direction and a character 542 indicating a movement distance. In some embodiments, the calibration information 540 may also include a color display object 543. The color display object 543 may be displayed in different colors depending on a difference between the size of the pattern regions 231 and 232 and the size of the reference pattern region. The user may rearrange the pattern board 30 by referring to the calibration information 540 that is output on the screen 210 of the display device 200.

As the pattern board 30 is moved, the calibration information 540 may be updated in real time. FIG. 13 illustrates an example where the calibration information 540 for indicating that the distance from the target point is 90 cm and the calibration information 540 for indicating that the distance from the target point is 70 cm are sequentially displayed. The user may identify the rearrangement status of the pattern board 30 by referring to the calibration information 540 updated in real time.

Similar to an example shown in FIG. 13 where the calibration information is updated in real time as the pattern board 30 is moved on the ground, during the first movement, the second movement, and the rotation of the pattern board 30 as shown in FIGS. 10 to 12, the calibration information 510, 520, and 530 may be updated in real time as well.

Referring to FIG. 14, the calibration image 650 may include image information 550 of indicating that the calibration of the pattern board 30 is completed.

When the pattern board 30 is rearranged so that the pattern board image 230 is aligned with the reference lines 61 and 62 and/or the size of the pattern regions 231 and 232 and the size of the reference pattern region are equal, image information (completion information) 550 of indicating that the calibration is completed may be output. The completion information 550 may include a box 551 including the pattern board image 230 and a character 552 indicating completion.

The user may confirm that the rearrangement of the pattern board 30 is completed by referring to the completion information 550, and may perform an error correction operation thereafter.

In the present disclosure, the image processing unit 370 may individually generate the calibration information 510, 520, and 540 of indicating the movement of the pattern board 30 and the calibration information 530 of indicating the rotation of the pattern board 30. Accordingly, the calibration information 530 for rotation may not be included in the calibration image including the calibration information 510, 520, and 540 for movement. The user may move the pattern board 30 using the calibration information 510, 520, and 530 for movement, and rotate the pattern board 30 using the calibration information 530 for rotation.

The transmitting unit 380 may sequentially transmit calibration information of indicating the movement of the pattern board 30 (herein also referred to as movement calibration information) and calibration information of indicating the rotation of the pattern board 30 (herein also referred to as rotation calibration information). For example, the transmitting unit 380 may transmit the rotation calibration information after transmitting the movement calibration information or transmit the movement calibration information after transmitting the rotation calibration information. The order of transmission of the movement calibration information and the rotation calibration information may be set in advance or selected by the user.

The display device 200 may sequentially output movement calibration information and rotation calibration information. Accordingly, the user may rearrange the pattern board 30 according to the rotation calibration information after rearranging the pattern board 30 according to the movement calibration information, or may rearrange the pattern board 30 according to the movement calibration information after rearranging the pattern board 30 according to the rotation calibration information.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:
1. A digital side mirror system, comprising:
   imaging devices disposed on both sides of a vehicle;
   a display device including a screen for outputting images captured by the imaging devices; and
   a control device,
   wherein the control device comprises,
      a receiving unit for receiving an image including a pattern board image that represents a pattern board disposed at a rear side of the vehicle from the imaging devices;

an image processing unit for recognizing the pattern board image by analyzing the image, and in order for a center of the pattern board image to be displayed on the screen of the display device, generating calibration information of the pattern board for making the center of the pattern board image to be disposed on a preset reference line, and/or a center line of the pattern board image to be disposed on the reference line; and a transmitting unit for transmitting a calibration image generated by including the calibration information in the image to the display device, and wherein the calibration information includes at least one of a distance between the reference line and the center of the pattern board image or an angle of the pattern board image with respect to the reference line.

2. The digital side mirror system of claim 1, wherein the calibration information further includes a color display object that is displayed in different colors based on at least one of the distance between the reference line and the center of the pattern board image or the angle of the pattern board image with respect to the reference line.

3. The digital side mirror system of claim 1, wherein the image processing unit generates the calibration information of the pattern board for making a size of a pattern region included in the pattern board image and a size of a preset reference pattern region to be equal, and wherein the calibration information includes a difference between the size of the pattern region and the size of the reference pattern region.

4. The digital side mirror system of claim 3, wherein the calibration information comprises:

an icon that indicates a movement direction and/or a rotation direction of the pattern board to allow the center of the pattern board image to be disposed on the reference line on the screen of the display device and/or the size of the pattern region to be equal to the size of the reference pattern region; and one or more characters that indicate a movement distance and/or a rotation angle of the pattern board.

5. The digital side mirror system of claim 3, wherein the calibration information includes image information indicating that calibration of the pattern board is completed in response to the center of the pattern board image being disposed on the reference line, the center line of the pattern board image being disposed on the reference line, or the size of the pattern region and the size of the reference pattern region being equal.

6. The digital side mirror system of claim 3, wherein the image processing unit compares the center of the pattern board image with the reference line, compares the center line of the pattern board image with the reference line, or compares the size of the pattern region with the size of the reference pattern region to generate the calibration information in real time.

7. The digital side mirror system of claim 3, wherein the calibration information includes a color display object that is displayed in different colors based on the difference between the size of the pattern region and the size of the reference pattern region.

8. The digital side mirror system of claim 1, wherein the reference line comprises:

a first reference line oriented in a horizontal direction on the screen of the display device; and a second reference line oriented in a vertical direction on the screen of the display device, wherein a distance between the first reference line and the center of the pattern board image corresponds to a required movement distance in an up-down direction for rearrangement of the pattern board, and wherein a distance between the second reference line and the center of the pattern board image corresponds to a required movement distance in a left-right direction for rearrangement of the pattern board.

9. The digital side mirror system of claim 8, wherein the pattern board image comprises:

a plurality of pattern regions arranged in an up-down direction; and a plurality of intersection points formed where corners of adjacent pattern regions among the plurality of pattern regions meet, wherein an angle between the center line of the pattern board image formed by connecting the plurality of intersection points and the second reference line corresponds to a required rotation angle for calibrating a posture of the pattern board.

10. The digital side mirror system of claim 1, wherein operation modes of the control device comprises:

a first mode, in which the display device outputs images to assist a driver while driving; and a second mode, in which the display device outputs images to assist in correcting an installation error of the imaging devices.

11. The digital side mirror system of claim 10, wherein the control device further comprises an input unit for receiving a vehicle selection command in the second mode, and wherein the display device includes a touch screen for providing a function of the input unit.

12. The digital side mirror system of claim 1, wherein the image processing unit separately generates calibration information representing movement of the pattern board and calibration information representing rotation of the pattern board.

13. The digital side mirror system of claim 11, wherein the transmitting unit sequentially transmits the calibration information representing movement of the pattern board and the calibration information representing rotation of the pattern board.

* * * * *